UNITED STATES PATENT OFFICE.

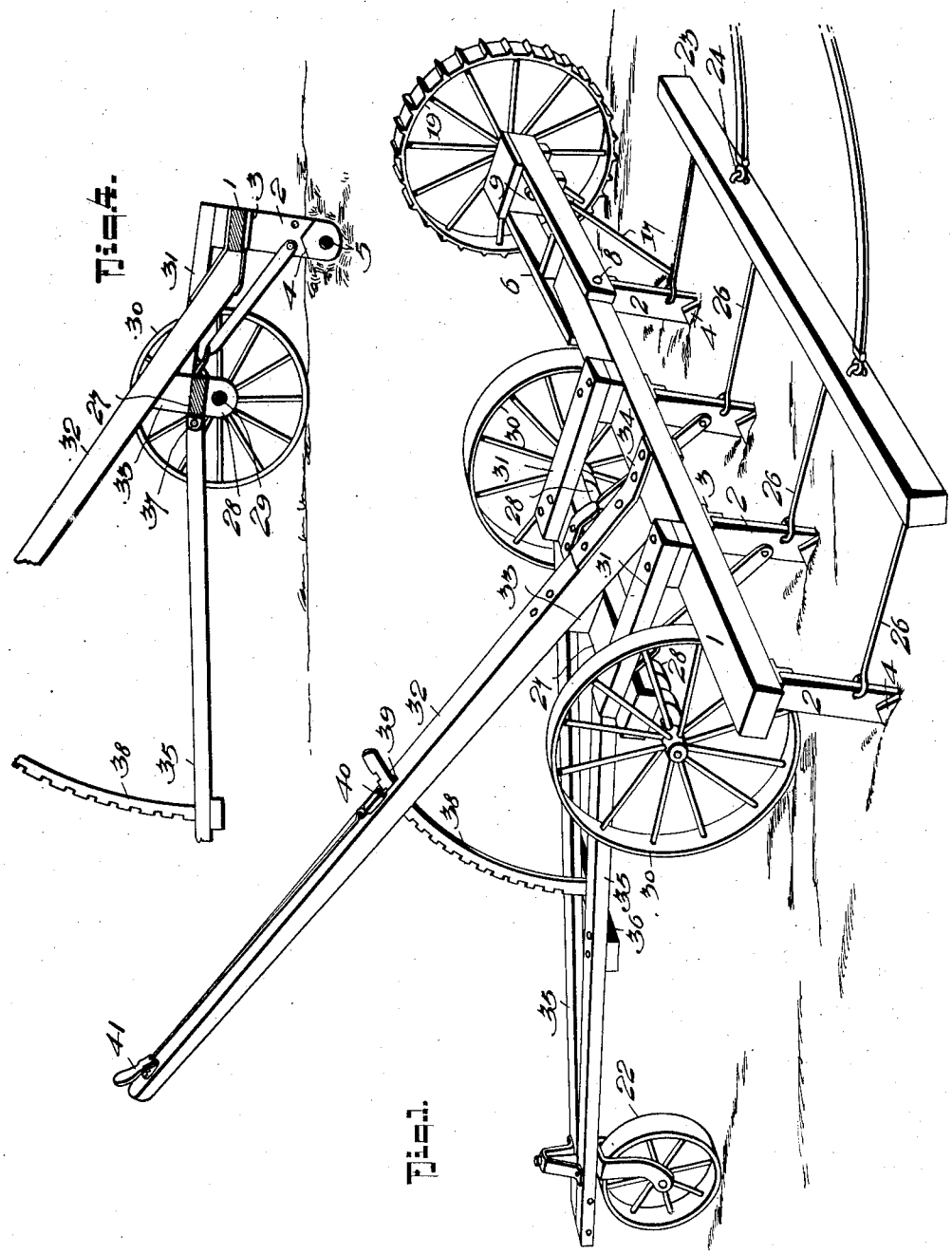

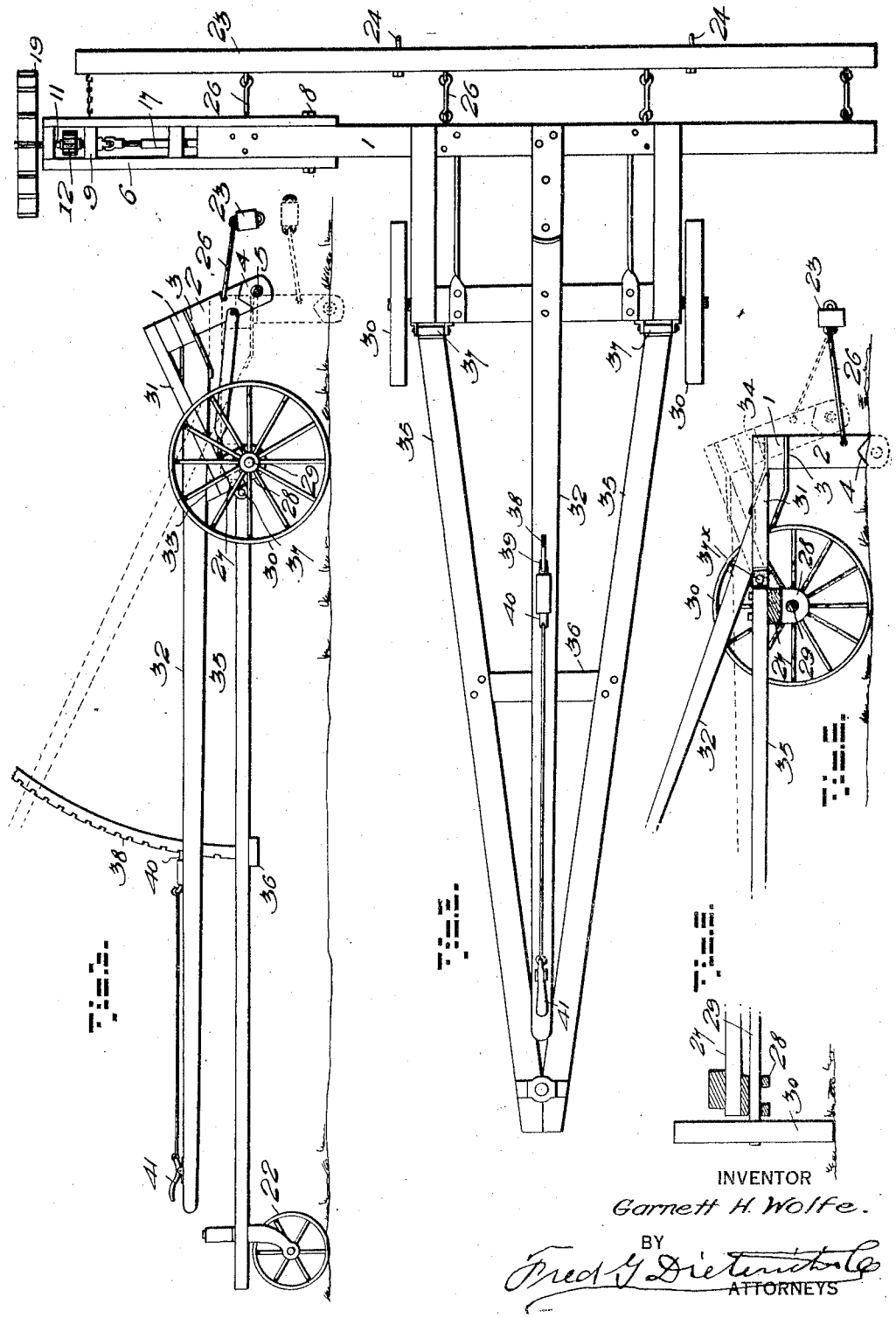

GARNETT H. WOLFE, OF CHENEY, WASHINGTON, ASSIGNOR TO ROTARY ROD WEEDER AND MANUFACTURING COMPANY, INCORPORATED, OF CHENEY, WASHINGTON.

ROTARY-ROD WEEDER.

1,338,203.   Specification of Letters Patent.   Patented Apr. 27, 1920.

Application filed October 25, 1919. Serial No. 333,184.

*To all whom it may concern:*

Be it known that I, GARNETT H. WOLFE, a citizen of the United States, residing at Cheney, in the county of Spokane and State of Washington, have invented certain new and useful Improvements in Rotary-Rod Weeders, of which the following is a specification.

The invention relates to the art of agricultural machinery and especially to machines which are adapted to be used for the purpose of destroying weeds and undergrowth, so as to leave the soil in better condition for planting. The present invention, in the embodiment shown and described, is an improvement on the type of weeder shown and described in United States Patent No. 1,232,149, issued July 3, 1917, and it has for its objects to make provision for an accurate gaging of the depth of the rod in the ground, to make provision for quick changes in the depth of penetration at any time or place in the field, and to provide means whereby the entire machine can be moved on its own wheels from one field to another or anywhere desired.

In the accompanying drawings is illustrated a preferred embodiment of the invention and by reference thereto it will be observed that Figure 1 is a perspective view illustrating the parts, positioned as in use, the rod having penetrated the ground.

Fig. 2 is a top plan view of the machine.

Fig. 3 is a diagrammatic side elevation (parts being omitted) showing how the rod may be raised from the ground for cleaning and for transporting the machine.

Fig. 4 is a detail vertical longitudinal section showing the position of the parts with the rod under the ground (the operating position).

Fig. 5 is a detail section of a portion of the invention.

Fig. 6 is a diagrammatic view of a modification of the invention.

In the drawings, in which like numerals of reference indicate like parts in all of the figures, those parts numbered to and including the number 26 may be of the same construction as the parts bearing the same numerals in Patent No. 1,232,149, aforesaid, and they perform the same functions as the corresponding parts of the said patent. Briefly stated, they comprise a transverse beam 1, on the underside of which, and spaced at suitable intervals apart, is a series of brackets 3 from which the pendent supports 2 project, the latter having the shaft bearings 4 for the rotary rod or shaft 5, which is driven through a driving shaft 17 that in turn is operated by a traction wheel 19 through gearing 12 and shafting 11, mounted in bearing blocks 9, that are carried by an extension frame 6 which is pivoted at 8 to the end of the beam 1; 23 is a hitch bar having suitable fixtures 24 to which the draft harness for the team may be attached. The bar 23 is connected by links 26 to the members 2.

The present invention includes a truck composed of a beam 27 having shaft brackets 28 secured thereto, for the shaft 29 which carries the wheels 30. The beams 1 and 27 are connected together by longitudinal connections 31 and by a lever 32, the latter being fastened at 33 to the beam 27 and at 34 to the beam 1.

The tiller consists of a frame made up of bars 35 which are hinged at 37 to the beam 27 and converge rearwardly where they are secured together at the ends and sustain the caster wheel 22, the bars 35 being braced at 36. 38 is an arcuate rack which coöperates with a latch dog 40 (and preferably passes through a hole 39 in the lever 32) to retain the lever 32 in its different angular positions with respect to the tiller frame, the dog 40 being releasable by a handle 41.

In operation, in moving the machine from field to field, the lever 32 is brought down to adjacent to the tiller frame (see Fig. 3) which elevates the rod 5 above the ground. This also is done when it is desired to clean the rod or free it from any accumulations of debris.

When it is desired to have the rod in operation, the lever 32 is raised to a suitable distance (Fig. 1) which causes the rod 5 to rest on the ground and the wheels 30 to be lifted off the ground a distance depending upon the position of the lever 32, thus throwing the weight of the machine on the rod 5, which will thereby be caused to enter the ground, as the machine is pulled along, to the desired depth, limited by the engagement of the wheels 30 with the ground.

By changing the position of the lever 32, the depth of penetration of the rod may be varied at will. It will be seen that the shaft 29 thus forms the pivot or fulcrum for the lever 32 in raising and lowering the rod 5.

Instead of the tiller frame bars 35 being hinged to the bar 27 they may be rigidly connected thereto, and the bars 31 may be hinged to the beam 27 at the front, as at 37×. (See Fig. 6).

While but one embodiment of the invention is shown in detail, and another embodiment diagrammatically illustrated, it is to be understood, however, that various modifications of the same will occur to those skilled in the art and they may be made without departing from the principle of the invention and it is not to be understood that the invention is limited hereby to the specific embodiments thereof illustrated in the accompanying drawings.

From the foregoing description, taken in connection with the accompanying drawings, it is thought the complete construction, operation and advantages of the invention will be clear to those skilled in the art to which it appertains.

What I claim is:—

1. In rotary rod weeders, a wheeled truck including cross beams, pendent bearing supports carried thereby, a rotary rod journaled in said supports, means for driving said rod, a tiller frame hinged to said truck, a caster wheel mounted on said tiller frame, and means coöperative between said tiller frame and said truck to raise and lower said rotary rod.

2. In rotary rod weeders, a cross beam, wheels for supporting said cross beam, rearwardly projecting beams connected to said cross beam, a caster wheel at the rear end of said rearwardly projecting beams, a second cross beam connected with said first cross beam and located in front of said first mentioned wheels, rotary rod bearing supports carried by said second cross beam, a rotary rod journaled in said supports, means for driving said rod, and means for raising and lowering said second beam to elevate or depress the rotary rod.

3. In rotary rod weeders, the combination with the rotary-rod carrying beam, of a wheeled truck to which said rod carrying beam is connected in front, a wheeled tiller frame secured to said truck in the back, and means for raising and lowering said rod carrying beam with respect to said tiller frame and truck to thereby lift and lower the rotary rod.

4. In rotary rod weeders, the combination with the rotary-rod carrying beam, of a wheeled truck to which said rod carrying wheel is connected to project in front of the same, a tiller frame connected to said truck to project rearwardly therefrom, a wheel for sustaining the rear end of said tiller frame, and means for swinging the rod carrying beam about the axis of the wheels of said truck to thereby raise and lower the rotary rod.

5. In a rotary rod weeder, the combination with the rotary rod carrying beam, of a wheeled truck to which said rod carrying wheel is connected to project in front of the same, a tiller frame connected to said truck to project rearwardly therefrom, a wheel for sustaining the rear end of said tiller frame, means for swinging the rod carrying beam about the axis of the wheels of said truck to thereby raise and lower the rotary rod, said means comprising a lever rigidly connected to said truck and to said rod carrying beam, and adjustably connected with said tiller frame, said tiller frame being flexibly connected to said truck.

6. In a rotary rod weeder, a transverse beam, pendent supports mounted thereon, rod bearings on said supports, a rotatable rod mounted in said supports, means to rotate said rod, another transverse beam, a wheeled axle mounted on the latter beam, means rigidly connecting both beams together, a tiller frame pivoted to said other transverse beam and an adjustable connection between said beams and said tiller frame for varying the angular adjustment between the tiller frame and said beams.

7. In rotary rod weeders, a transverse beam which carries the rotary rod and its driving mechanism, a tiller connected with said beam, and means for raising said beam to lift the rotary rod out of the ground while said tiller remains in engagement with the ground.

8. In rotary rod weeders, a beam which carries the rotary rod and its driving mechanism, a tiller connected with said beam, and means for raising the rotary rod out of the ground while said tiller remains in contact with the ground.

9. In rotary-rod weeders, the combination with the rotary-rod carrying beam, of a wheeled truck to which said rod carrying beam is connected in front, a wheeled tiller frame secured to said truck in the back, and manually operable means for raising and lowering said rod carrying beam with respect to said tiller frame and truck to thereby lift and lower the rotary rod.

GARNETT H. WOLFE.